US012726982B2

(12) United States Patent
Lin

(10) Patent No.: US 12,726,982 B2
(45) Date of Patent: Sep. 1, 2026

(54) WIRELESS COMMUNICATION METHOD, USER EQUIPMENT, AND BASE STATION

(71) Applicant: GUANGDONG OPPO MOBILE TELECOMMUNICATIONS CORP., LTD., Guangdong (CN)

(72) Inventor: Hao Lin, Neuilly-sur-seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 412 days.

(21) Appl. No.: 18/505,099

(22) Filed: Nov. 8, 2023

(65) Prior Publication Data

US 2024/0089965 A1 Mar. 14, 2024

Related U.S. Application Data

(63) Continuation of application No. PCT/IB2021/000350, filed on May 10, 2021.

(51) Int. Cl.
*H04W 72/1273* (2023.01)
*H04W 72/0446* (2023.01)
*H04W 72/11* (2023.01)
*H04W 72/21* (2023.01)

(52) U.S. Cl.
CPC ... *H04W 72/1273* (2013.01); *H04W 72/0446* (2013.01); *H04W 72/11* (2023.01); *H04W 72/21* (2023.01)

(58) Field of Classification Search
CPC ............. H04W 72/11; H04W 72/0446; H04W 72/1273; H04W 72/21; H04L 1/1854
See application file for complete search history.

(56) References Cited

U.S. PATENT DOCUMENTS

| | | | | |
|---|---|---|---|---|
| 12,501,448 | B2 * | 12/2025 | Gao | H04L 1/1861 |
| 12,549,292 | B2 * | 2/2026 | Gao | H04L 1/1854 |
| 12,550,140 | B2 * | 2/2026 | Lee | H04W 72/1273 |
| 2022/0116158 | A1 * | 4/2022 | Park | H04L 1/1896 |
| 2022/0183002 | A1 * | 6/2022 | Yeo | H04L 1/1854 |
| 2022/0329366 | A1 * | 10/2022 | Kim | H04L 5/0055 |

(Continued)

FOREIGN PATENT DOCUMENTS

| | | |
|---|---|---|
| WO | 2021033116 | 2/2021 |
| WO | 2021034470 | 2/2021 |

OTHER PUBLICATIONS

"3rd Generation Partnership Project; Technical Specification Group Radio Access Network; NR; Physical layer procedures for data (Release 16)," 3GPP TS 38.214, Mar. 2021, v16.5.0.

(Continued)

*Primary Examiner* — Brian D Nguyen
(74) *Attorney, Agent, or Firm* — Hodgson Russ LLP

(57) ABSTRACT

A wireless communication method, a user equipment (UE), and a base station are provided. The wireless communication method includes being configured, by a base station, with a first information for a serving cell and determining one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers.

18 Claims, 6 Drawing Sheets

200

202 Being configured, by a base station, with a first information for a serving cell 204 Determining one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers

(56) References Cited

U.S. PATENT DOCUMENTS

2024/0305433 A1* 9/2024 Bae ........................ H04L 1/1854
2024/0314779 A1* 9/2024 Park .................. H04W 72/1273

OTHER PUBLICATIONS

"3rd Generation Partnership Project; Technical Specification Group Radio Access Network; Study on New Radio (NR) to support non-terrestrial networks (Release 15)," 3GPP TR 38.811, Sep. 2020, v15.4.0.

"3rd Generation Partnership Project; Technical Specification Group Radio Access Network; Solutions for NR to support non-terrestrial networks (NTN) (Release 16)," 3GPP TR 38.821, Sep. 2019, v16.0.0.

Intel Corporation, "Discussion on Required Changes to NR in 52.6-71 Ghz," 3GPP TSG RAN WG1 Meeting #102-e, R1-2006986, Aug. 2020.

WIPO, International Search Report and Written Opinion for International Application No. PCT/IB2021/000350, Feb. 7, 2022.

* cited by examiner

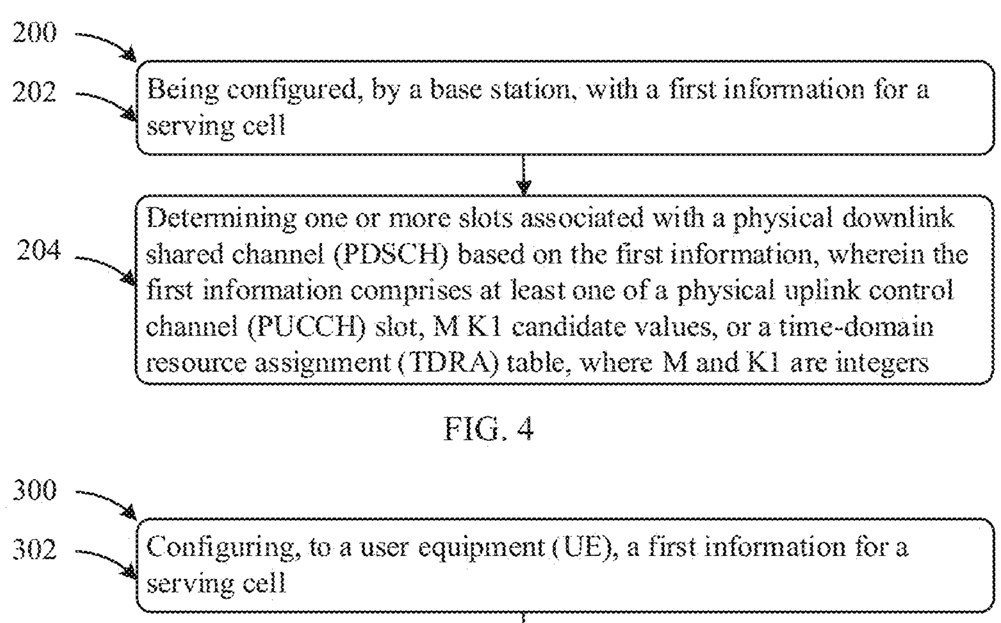
FIG. 4
FIG. 5
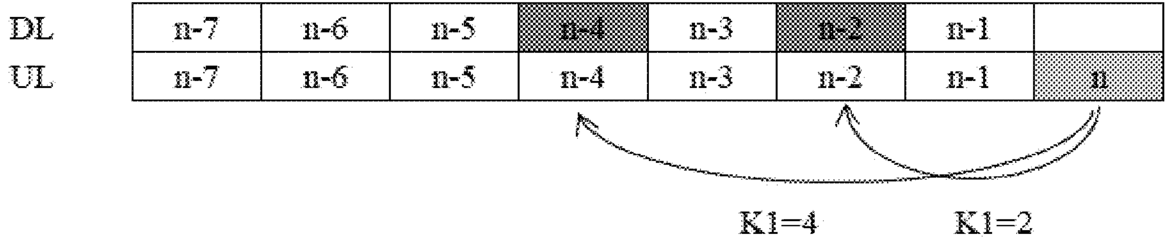
FIG. 6
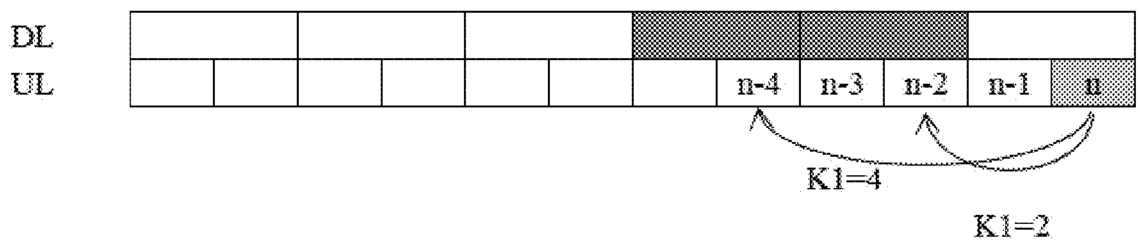
FIG. 7

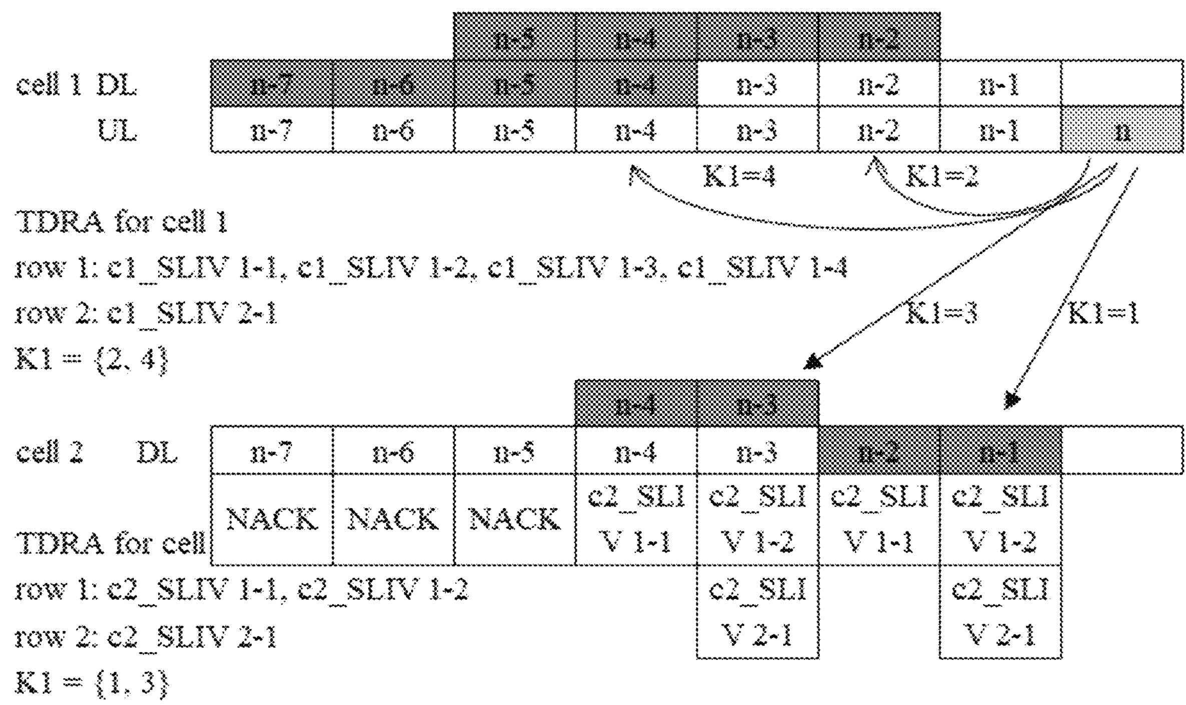
FIG. 12
| | slot n-4 | | | | slot n-3 | | | | slot n-2 | | | | slot n-1 | | | |
|---|---|---|---|---|---|---|---|---|---|---|---|---|---|---|---|---|
| cell 1 | | | | | NACK | NACK | NACK | NACK | | | | | NACK | NACK | NACK | NACK |
| cell 2 | NACK | NACK | NACK | NACK | | | | | NACK | NACK | NACK | NACK | | | | |
FIG. 13
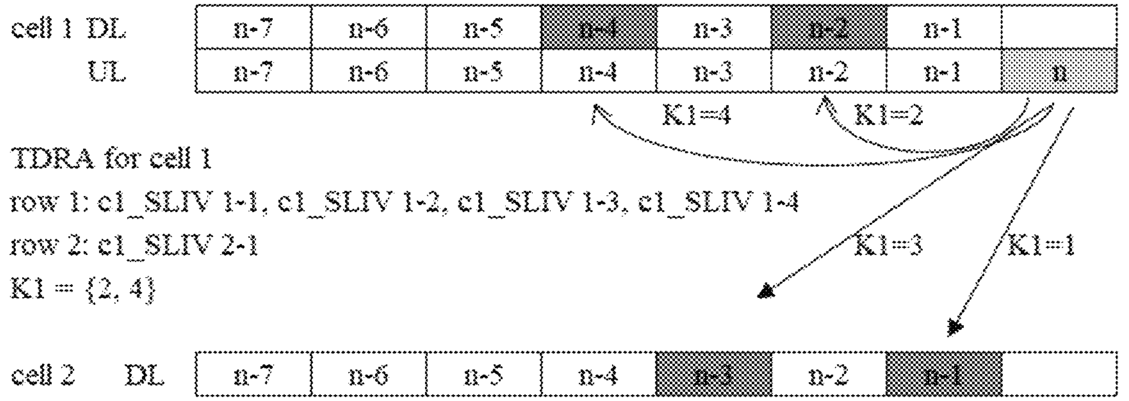
TDRA for cell 2
row 1: c2_SLIV 1-1, c2_SLIV 1-2
row 2: c2_SLIV 2-1
K1 = {1, 3}
FIG. 14

WIRELESS COMMUNICATION METHOD, USER EQUIPMENT, AND BASE STATION

CROSS REFERENCE TO RELATED APPLICATION(S)

This application is a continuation of International Application No. PCT/IB2021/000350, filed May 10, 2021, the entire disclosure of which is incorporated herein by reference.

BACKGROUND OF DISCLOSURE

1. Field of the Disclosure

The present disclosure relates to the field of communication systems, and more particularly, to a wireless communication method, a user equipment (UE), and a base station.

2. Description of the Related Art

In current releases of a new radio (NR) system, such as release 15 and release 16 of the NR system, a resource allocation for downlink data, such as a physical downlink shared channel (PDSCH), has been specified in TS 38.214 section 5. A PDSCH may be scheduled by a downlink control information (DCI) format. The PDSCH contains a transport block corresponding to a hybrid automatic repeat request (HARQ) process number. However, in some cases, e.g., high throughput requested applications such as virtual reality and/or augmented reality (VR/AR) or non-terrestrial communications as described in TR 38.811 or TS 38.821, a user equipment (UE) needs to receive PDSCHs carrying different transport blocks consecutively in time domain. In some extreme cases, the UE receives PDSCH in consecutive slots. For such applications, if a network follows Re1.15 or Re1.16 specifications, the network needs to spend many DCIs in order to schedule these PDSCH transmissions. Obviously, it will consume a lot of signaling overhead. The method of PDSCH scheduling for a new radio (NR) system comprises that a network may schedule one or more PDSCH transmissions by a same DCI format.

Therefore, there is a need for an apparatus and a method of wireless communication, which can solve issues in the prior art, provide a method for hybrid automatic repeat request acknowledgement (HARQ-ACK) codebook design for multiple PDSCH scheduling, reduce a signaling overhead, provide a good communication performance, and/or provide high reliability.

SUMMARY

In a first aspect of the present disclosure, a method of wireless communication by a user equipment (UE) comprises being configured, by a base station, with a first information for a serving cell and determining one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers.

In a second aspect of the present disclosure, a method of wireless communication by a base station comprises configuring, to a user equipment (UE), a first information for a serving cell and controlling the UE to determine one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers.

In a third aspect of the present disclosure, a user equipment comprises a memory, a transceiver, and a processor coupled to the memory and the transceiver. The processor is configured, by a base station, with a first information for a serving cell, and the processor is configured to determine one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers.

In a fourth aspect of the present disclosure, a base station comprises a memory, a transceiver, and a processor coupled to the memory and the transceiver. The processor is configured to configure perform the method in the second aspect.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 4 is a flowchart illustrating a method of wireless communication performed by a user equipment (UE) according to an embodiment of the present disclosure.

FIG. 5 is a flowchart illustrating a method of wireless communication performed by a base station according to an embodiment of the present disclosure.

FIG. 6 is a schematic diagram illustrating an example of a method for hybrid automatic repeat request acknowledgement (HARQ-ACK) codebook design for multiple PDSCH scheduling according to an embodiment of the present disclosure.

FIG. 7 is a schematic diagram illustrating an example of a method for hybrid automatic repeat request acknowledgement (HARQ-ACK) codebook design for multiple PDSCH scheduling according to an embodiment of the present disclosure.

FIG. 12 is a schematic diagram illustrating an example of a method for hybrid automatic repeat request acknowledgement (HARQ-ACK) codebook design for multiple PDSCH scheduling according to an embodiment of the present disclosure.

FIG. 13 is a schematic diagram illustrating an example of a method for hybrid automatic repeat request acknowledgement (HARQ-ACK) codebook design for multiple PDSCH scheduling according to an embodiment of the present disclosure.

FIG. 14 is a schematic diagram illustrating an example of a method for hybrid automatic repeat request acknowledgement (HARQ-ACK) codebook design for multiple PDSCH scheduling according to an embodiment of the present disclosure.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
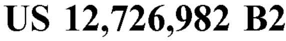
FIG. 1 is a block diagram of one or more user equipments (UEs) and a base station (e.g., gNB) of communication in a communication network system according to an embodiment of the present disclosure.
Figure 1:
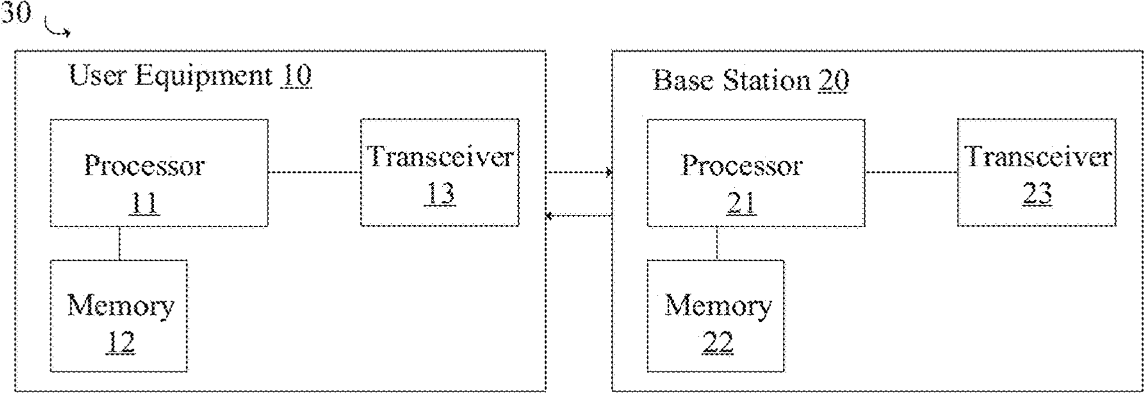

FIG. 1 illustrates that, in some embodiments, one or more user equipments (UEs) 10 and a base station (e.g., gNB) 20 for transmission adjustment in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

Figure 2:
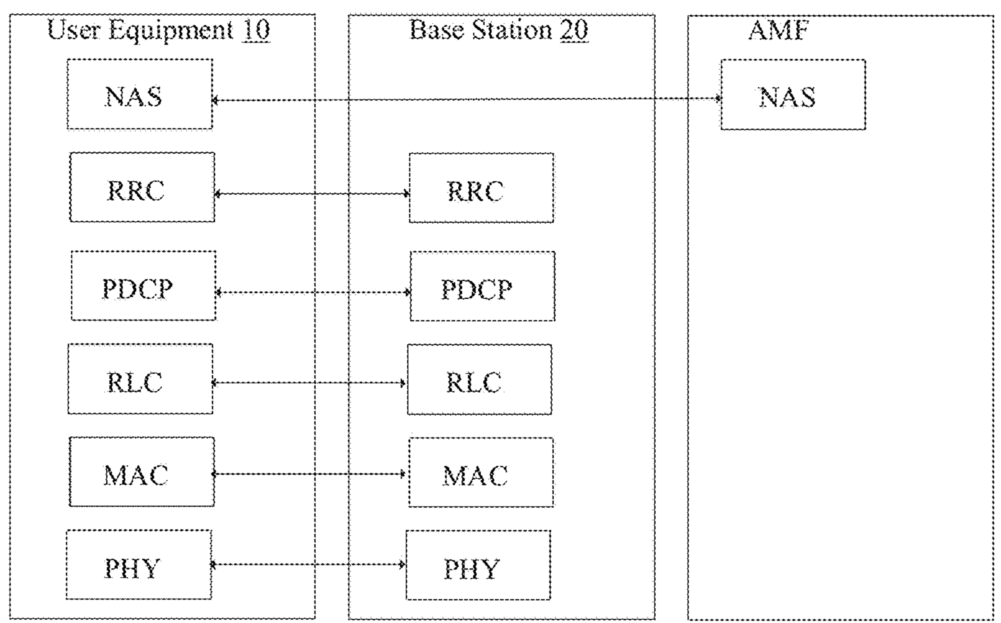
FIG. 2 is a schematic diagram illustrating an example user plane protocol stack according to an embodiment of the present disclosure.

FIG. 2 illustrates an example user plane protocol stack according to an embodiment of the present disclosure. FIG. 2 illustrates that, in some embodiments, in the user plane protocol stack, where service data adaptation protocol (SDAP), packet data convergence protocol (PDCP), radio link control (RLC), and media access control (MAC) sublayers and physical (PHY) layer may be terminated in a UE 10 and a base station 20 (such as gNB) on a network side. In an example, a PHY layer provides transport services to higher layers (e.g., MAC, RRC, etc.). In an example, services and functions of a MAC sublayer may comprise mapping between logical channels and transport channels, multiplexing/demultiplexing of MAC service data units (SDUs) belonging to one or different logical channels into/from transport blocks (TBs) delivered to/from the PHY layer, scheduling information reporting, error correction through hybrid automatic repeat request (HARQ) (e.g. one HARQ entity per carrier in case of carrier aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or transmission time interval (TTI) durations. In an example, automatic repeat request (ARQ) may operate on any of the numerologies and/or TTI durations the logical channel is configured with. In an example, services and functions of the PDCP layer for the user plane may comprise sequence numbering, header compression, and decompression, transfer of user data, reordering and duplicate detection, PDCP PDU routing (e.g., in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping quality of service Indicator (QFI) in downlink (DL) and uplink (UL) packets. In an example, a protocol entity of SDAP may be configured for an individual PDU session.

Figure 3:
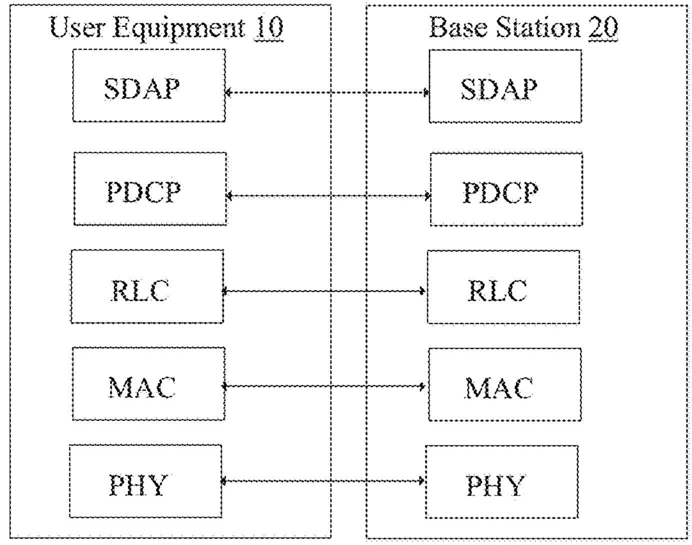
FIG. 3 is a schematic diagram illustrating an example control plane protocol stack according to an embodiment of the present disclosure.

FIG. 3 illustrates an example control plane protocol stack according to an embodiment of the present disclosure. FIG. 2 illustrates that, in some embodiments, in the control plane protocol stack where PDCP, RLC, and MAC sublayers and PHY layer may be terminated in a UE 10 and a base station 20 (such as gNB) on a network side and perform service and functions described above. In an example, RRC used to control a radio resource between the UE and a base station (such as a gNB). In an example, RRC may be terminated in a UE and the gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of signaling radio bearers (SRBs) and data radio bearers (DRBs), mobility functions, QoS management functions, UE measurement reporting and control of the reporting, detection of and recovery from radio link failure, and/or NAS message transfer to/from NAS from/to a UE. In an example, NAS control protocol may be terminated in the UE and AMF on a network side and may perform functions such as authentication, mobility management between a UE and an AMF for 3GPP access and non-3GPP access, and session management between a UE and a SMF for 3GPP access and non-3GPP access.

In some embodiments, the processor 11 is configured, by the base station 20, with a first information for a serving cell, and the processor 11 is configured to determine one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers. This can solve issues in the prior art, provide a method for hybrid automatic repeat request acknowledgement (HARQ-ACK) codebook design for multiple PDSCH scheduling, reduce a signaling overhead, provide a good communication performance, and/or provide high reliability.

In some embodiments, the processor 21 is configured to configure, to the user equipment (UE) 10, a first information for a serving cell and control the UE 10 to determine one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers. This can solve issues in the prior art, provide a method for hybrid automatic repeat request acknowledgement (HARQ-ACK) codebook design for multiple PDSCH scheduling, reduce a signaling overhead, provide a good communication performance, and/or provide high reliability.

FIG. 4 illustrates a method 200 of wireless communication by a user equipment (UE) according to an embodiment of the present disclosure. In some embodiments, the method 200 includes: a block 202, being configured, by a base station, with a first information for a serving cell, and a block 204, determining one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers. This can solve issues in the prior art, provide a method for hybrid automatic repeat request acknowledgement (HARQ-ACK) codebook design for multiple PDSCH scheduling, reduce a signaling overhead, provide a good communication performance, and/or provide high reliability.

FIG. 5 illustrates a method 300 of wireless communication by a base station according to an embodiment of the present disclosure. In some embodiments, the method 300 includes: a block 302, configuring, to a user equipment (UE), a first information for a serving cell, and a block 304, controlling the UE to determine one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers. This can solve issues in the prior art, provide a method for hybrid automatic repeat request acknowledgement (HARQ-ACK) codebook design for multiple PDSCH scheduling, reduce a signaling overhead, provide a good communication performance, and/or provide high reliability.

In some embodiments, the UE determines a type 1 codebook size by determining the one or more slots associated with the PDSCH based on the first information. In some embodiments, the one or more slots are used for a candidate PDSCH reception, a semi-persistent scheduling (SPS) PDSCH release, or an SPS PDSCH reception. In some embodiments, a value of K1 is used to determine a last slot for the candidate PDSCH reception, the SPS PDSCH release, or the SPS PDSCH reception. In some embodiments, the last slot for the candidate PDSCH reception, the SPS PDSCH release, or the SPS PDSCH reception is determined by a downlink (DL) slot of a DL bandwidth part (BWP) that is an uplink (UL) slot n-K1 of an UL BWP, and the UL slot n is an initial UL slot. In some embodiments, the DL BWP and the UL BWP have a same subcarrier spacing (SCS). In some embodiments, the last slot for the candidate PDSCH reception, the SPS PDSCH release, or the SPS PDSCH reception is determined by a downlink (DL) slot of a DL bandwidth part (BWP) that is overlapped with an uplink (UL) slot n-K1 of an UL BWP, and the UL slot n is an initial UL slot. In some embodiments, the DL BWP and the UL BWP have a different subcarrier spacing (SCS). In some embodiments, the UE uses the TDRA table to expand DL slots for the candidate PDSCH reception, the SPS PDSCH release, or the SPS PDSCH reception according to the PUCCH slot. In some embodiments, the UE determines one or more initial DL slots from the PUCCH slot and one or more K1 values.

In some embodiments, the UE expands a DL slot by a maximum number (L) of a PDSCH scheduled by a downlink control information (DCI). In some embodiments, a value of L can be derived from the TDRA table, the TDRA table contains N rows, and each row contains one or more start and length indicator value (SLIV) values, where N in an integer. In some embodiments, a greatest number of SLIV values among N rows is a value of L. In some embodiments, determined DL slots for the candidate PDSCH reception, the SPS PDSCH release, or the SPS PDSCH reception according to the PUCCH slot are a union of the expanded DL slots. In some embodiments, the method further comprises determining whether the expanded DL slots are valid. In some embodiments, the UE is configured with serving cells, the UE determines DL slots for each serving cell, and determined DL slots are a union between the serving cells. In some embodiments, the type 1 codebook size for each serving cell is equal to a determined number of DL slots. In some embodiments, the determined DL slots are consecutive non-uplink slots. In some embodiments, the UE checks the one or more SLIV values in the determined DL slot to determine the type 1 codebook size. In some embodiments, the one or more SLIV values determine a starting symbol of the PDSCH and a length of the PDSCH that can be scheduled within the determined DL slot.

In some embodiments, if there is only one SLIV value used to schedule the PDSCH in the DL slot, the UE does not need to check the SLIV value and reserves 1 bit in the type 1 codebook for the DL slot. In some embodiments, if PDSCH transmissions derived from SLIV values are overlapped in one slot, the UE reserves 1 bit in the type 1 codebook for the DL slot. In some embodiments, if the PDSCH is not to be scheduled in the DL slot, the UE uses a negative acknowledgment (NACK) bit to reserve a bit position in the type 1 codebook. In some embodiments, the UE determines the type 1 codebook size depends on a number of K1 values, a maximum of number of PDSCHs to be scheduled by a DCI, and/or a maximum number of coding block groups (CBG) for a transport block. In some embodiments, the type 1 codebook size is equal to a number of DL slots times a maximum number of PDSCHs scheduled by the DCI. In some embodiments, for a given serving cell and for each determined DL slot, a reserved number of bits is equal to a maximum between a maximum number of PDSCHs scheduled by the DCI and a configured maximum number of CBGs. In some embodiments, when one PDSCH scheduled by the DCI falls in the determined DL slot, the UE reports a same HARQ-ACK information of a PDSCH reception repeatedly in the reserved number of bits of the determined DL slot.

For a serving cell c, a UE is configured, by a network, with M K1 candidate values, where M is an integer. Moreover, the UE is configured, by the network, with a TDRA table, which contains N rows, in each row, it contains one or more SLIVs.

Type-1 HARQ-ACK Codebook Determination:

This example applies if the UE is configured with pdsch-HARQ-ACK-Codebook=semi-static. A UE reports HARQ-ACK information for a corresponding PDSCH reception or SPS PDSCH release only in a HARQ-ACK codebook that the UE transmits in a slot indicated by a value of a PDSCH-to-HARQ feedback timing indicator field in a corresponding DCI format 1_0 or DCI format 1_1. The UE reports NACK value(s) for HARQ-ACK information bit(s) in a HARQ-ACK codebook that the UE transmits in a slot not indicated by a value of a PDSCH-to-HARQ feedback timing indicator field in a corresponding DCI format 1_0 or DCI format 1_1. If the UE is provided pdsch-AggregationFactor, $$N_{PDSCH}^{repeat}$$

is a value of pdsch-AggregationFactor; otherwise, $$N_{PDSCH}^{repeat} = 1.$$

The UE reports HARQ-ACK information for a PDSCH reception from slot $$n - N_{PDSCH}^{repeat} + 1$$

to slot n only in a HARQ-ACK codebook that the UE includes in a PUCCH or PUSCH transmission in slot n+k, where k is a number of slots indicated by the PDSCH-to-HARQ feedback timing indicator field in a corresponding DCI format or provided by dl-DataToUL-ACK if the PDSCH-to-HARQ feedback timing indicator field is not present in the DCI format. If the UE reports HARQ-ACK information for the PDSCH reception in a slot other than slot n+k, the UE sets a value for each corresponding HARQ-ACK information bit to NACK.

If a UE reports HARQ-ACK information in a PUCCH only for a SPS PDSCH release indicated by DCI format 1_0 with counter DAI field value of 1 on the PCell, or a PDSCH reception scheduled by DCI format 1_0 with counter DAI field value of 1 on the PCell, or SPS PDSCH reception, within the $M_{A,c}$ occasions for candidate PDSCH receptions, the UE determines a HARQ-ACK codebook only for the SPS PDSCH release or only for the PDSCH reception or only for the SPS PDSCH reception according to corresponding $M_{A,c}$ occasion(s) on respective serving cell(s), where the value of counter DAI in DCI format 1_0 is according to Table 9.1.3-1; otherwise, the procedures for a HARQ-ACK codebook determination apply.

Type-1 HARQ-ACK Codebook in Physical Uplink Control Channel:

For a serving cell c, an active DL BWP, and an active UL BWP, as described in Clause 12, the UE determines a set of $M_{A,c}$ occasions for candidate PDSCH receptions for which the UE can transmit corresponding HARQ-ACK information in a PUCCH in slot $n_U$. If serving cell c is deactivated, the UE uses as the active DL BWP for determining the set of $M_{A,c}$ occasions for candidate PDSCH receptions a DL BWP provided by firstActiveDownlinkBWP-Id. The determination is based: a) on a set of slot timing values K1 associated with the active UL BWP. 1) If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0. 2) If the UE is configured to monitor PDCCH for DCI format 1_1 for serving cell c, $K_1$ is provided by dl-DataToUL-ACK for DCI format 1_1. b) on a set of row indexes R of a table that is provided either by a first set of row indexes of a table that is provided by pdsch-TimeDomainAllocationList in pdsch-ConfigCommon or by Default PDSCH time domain resource allocation A [6, TS 38.214], or by the union of the first set of row indexes and a second set of row indexes, if provided by pdsch-TimeDomainAllocationList in pdsch-Config, associated with the active DL BWP and defining respective sets of slot offsets $K_0$, start and length indicators SLIV, and PDSCH mapping types for PDSCH reception as described in [6, TS 38.214]. c) on the ratio $2^{\mu_{DL}-\mu_{UL}}$ between the downlink SCS configuration $\mu_{DL}$ and the uplink SCS configuration $\mu_{UL}$ provided by subcarrierSpacing in BWP Downlink and BWP-Uplink for the active DL BWP and the active UL BWP, respectively. d) if provided, on tdd-UL-DL-ConfigurationCommon and tdd-UL-DL-Configuration-Dedicated.

For the set of slot timing values $K_1$, the UE determines a set of $M_{A,c}$ occasions for candidate PDSCH receptions or SPS PDSCH releases according to the following pseudo-code. A location in the Type-1 HARQ-ACK codebook for HARQ-ACK information corresponding to a SPS PDSCH release is same as for a corresponding SPS PDSCH reception.

Resource Allocation in Time Domain:

When the UE is scheduled to receive PDSCH by a DCI, the Time domain resource assignment field value m of the DCI provides a row index m+1 to an allocation table. The determination of the used resource allocation table. The indexed row defines the slot offset $K_0$, the start and length indicator SLIV, or directly the start symbol S and the allocation length L, and the PDSCH mapping type to be assumed in the PDSCH reception.

Given the parameter values of the indexed row: The slot allocated for the PDSCH is $$\left\lfloor n\cdot\frac{2^{\mu_{PDSCH}}}{2^{\mu_{PDCCH}}}\right\rfloor+K_0,$$

where n is the slot with the scheduling DCI, and $K_0$ is based on the numerology of PDSCH, and $\mu_{PDSCH}$ and $\mu_{PDCCH}$ are the subcarrier spacing configurations for PDSCH and PDCCH, respectively, and the starting symbol S relative to the start of the slot, and the number of consecutive symbols L counting from the symbol S allocated for the PDSCH are determined from the start and length indicator SLIV: if $(L-1)\leq 7$ (then $SLIV=14\cdot(L-1)+S$, else $SLIV=14\cdot(14-L+1)+(14-1-S)$, where $0<L\leq 14-S$, and the PDSCH mapping type is set to Type A or Type B. The UE shall consider the S and L combinations defined in table 1 as valid PDSCH allocations:

TABLE 1

| Valid S and L combinations | | | | | | |
|---|---|---|---|---|---|---|
| PDSCH mapping | Normal cyclic prefix | | | Extended cyclic prefix | | |
| type | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

(Note 1):
S = 3 is applicable only if dmrs-TypeA-Position = 3

When receiving PDSCH scheduled by DCI format 1_1 in PDCCH with CRC scrambled by C-RNTI, MCS-C-RNTI, CS-RNTI, or PDSCH scheduled without corresponding PDCCH transmission using sps-Config and activated by DCI format 1_1, if the UE is configured with pdsch-AggregationFactor, the same symbol allocation is applied across the pdsch-AggregationFactor consecutive slots. The UE may expect that the TB is repeated within each symbol allocation among each of the pdsch-AggregationFactor consecutive slots and the PDSCH is limited to a single transmission layer. The redundancy version to be applied on the $n^{th}$ transmission occasion of the TB, where n=0, 1, . . . pdsch-AggregationFactor-1, is determined according to table 2 and "$rv_{id}$ indicated by the DCI scheduling the PDSCH" in table 5.1.2.1-2 is assumed to be 0 for PDSCH scheduled without corresponding PDCCH transmission using sps-Config and activated by DCI format 1_1.

TABLE 2

| Applied redundancy version when pdsch-AggregationFactor is present | | | | |
|---|---|---|---|---|
| $rv_{id}$ indicated by the | $rv_{id}$ to be applied to $n^{th}$ transmission occasion | | | |
| DCI scheduling the PDSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

A PDSCH reception in a slot of a multi-slot PDSCH reception is omitted according to the conditions. The UE is not expected to receive a PDSCH with mapping type A in a slot, if the PDCCH scheduling the PDSCH was received in the same slot and was not contained within the first three symbols of the slot. The UE is not expected to receive a PDSCH with mapping type B in a slot, if the first symbol of the PDCCH scheduling the PDSCH was received in a later symbol than the first symbol indicated in the PDSCH time domain resource allocation.

FIG. 6 illustrates an example of a method for hybrid automatic repeat request acknowledgement (HARQ-ACK) codebook design for multiple PDSCH scheduling according to an embodiment of the present disclosure. A UE determines a type 1 codebook size at least comprises the one of the followings. For serving cell c, determine one or more slot for candidate PDSCH reception or SPS PDSCH release or SPS PDSCH reception according to a PUCCH slot. One example of the one or more slot are determined based on the PUCCH slot and K1 and TDRA table. More specifically, the value of K1 is used to determine a last slot for candidate PDSCH reception or SPS PDSCH release or SPS PDSCH reception. An example is given in FIG. 6, where K1 is configured to be 2 or 4 (unit of slot), and for a PUCCH slot n, the last slot for candidate PDSCH reception or SPS PDSCH release or SPS PDSCH reception are DL slot n-2 and slot n-4. In this example we assume that the DL BWP and the UL BWP have the same subcarrier spacing (SCS).

Figure 8:
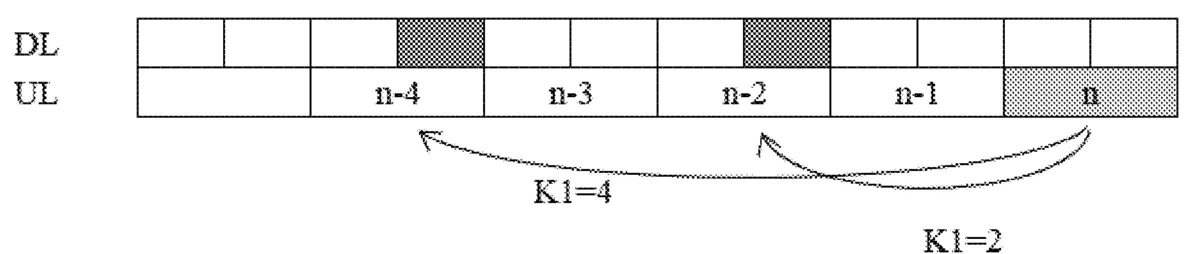
FIG. 8 is a schematic diagram illustrating an example of a method for hybrid automatic repeat request acknowledgement (HARQ-ACK) codebook design for multiple PDSCH scheduling according to an embodiment of the present disclosure.

FIG. 7 illustrates an example of a method for hybrid automatic repeat request acknowledgement (HARQ-ACK) codebook design for multiple PDSCH scheduling according to an embodiment of the present disclosure. FIG. 8 illustrates an example of a method for hybrid automatic repeat request acknowledgement (HARQ-ACK) codebook design for multiple PDSCH scheduling according to an embodiment of the present disclosure. FIG. 7 and FIG. 8 illustrate that, in some examples, the DL BWP and the UL BWP have different SCS. In FIG. 7, the SCS of UL BWP is larger than that of DL BWP. In FIG. 8, the SCS of UL BWP is smaller than that of DL BWP. In this example, the last slot for candidate PDSCH reception or SPS PDSCH release or SPS PDSCH reception according to a PUCCH slot is determined by the DL slot that is overlapped with UL slot n-K1. In FIG. 7, the first DL slot is the one overlapped with UL slot n-2. The second DL slot is the one overlapped with UL slot n-4. In FIG. 8, as there is more than one DL slot overlapped with UL slot n-2, then a pre-defined rule is applied, e.g., the earliest DL slot or the last DL slot overlapped with UL slot n-2. In our example, we assume a last DL slot overlapped with UL slot n-K1.

Figure 9:
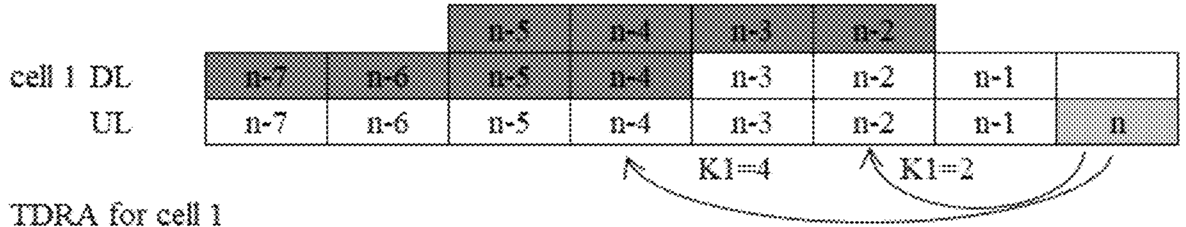
FIG. 9 is a schematic diagram illustrating an example of a method for hybrid automatic repeat request acknowledgement (HARQ-ACK) codebook design for multiple PDSCH scheduling according to an embodiment of the present disclosure.

FIG. 9 illustrates an example of a method for hybrid automatic repeat request acknowledgement (HARQ-ACK) codebook design for multiple PDSCH scheduling according to an embodiment of the present disclosure. In some examples, the UE uses TDRA table to expand the DL slots for candidate PDSCH reception or SPS PDSCH release or SPS PDSCH reception according to a PUCCH slot. Following the example of FIG. 6, the UE first determines two initial DL slot (i.e., slot n-2 and slot n-4) from the PUCCH slot n and two configured K1 values. Then, the UE expands the DL slot by a maximum number (L) of the PDSCH scheduled by a DCI. The value M or L can be derived from the configured TDRA table, where the table contains N rows, each row contains one or more SLIV values. The greatest number of SLIV values among N rows is the value of L. For instance, the TDRA table contains 2 rows, the first row has 4 SLIV values (denoted by SLIV 1-1, SLIV 1-2, SLIV 1-3, SLIV 1-4), implying that a DCI can schedule 4 PDSCHs, and the second row contain 1 SLIV value (denoted SLIV 2-1). Thus, the maximum number of PDSCHs scheduled by a DCI in this example is L=4. After expansions, for K1=2, the expanded DL slots are slot n-5, slot n-4, slot n-3, slot n-2. For K1=4, the expanded DL slots are slot n-7, slot n-6, slot n-5, slot n-4. Then the determined DL slots for candidate PDSCH reception or SPS PDSCH release or SPS PDSCH reception according to a PUCCH slot are the union of the above slots, i.e., slot n-7, n-6, n-5, n-4, n-3, n-2. Thus, there are 6 DL slots determined for the serving cell c.

Figure 10:
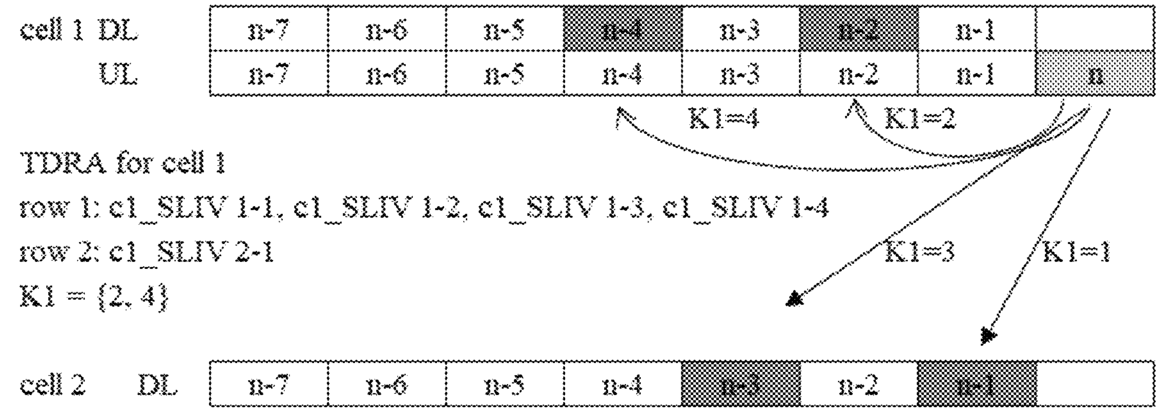
FIG. 10 is a schematic diagram illustrating an example of a method for hybrid automatic repeat request acknowledgement (HARQ-ACK) codebook design for multiple PDSCH scheduling according to an embodiment of the present disclosure.

FIG. 10 illustrates an example of a method for hybrid automatic repeat request acknowledgement (HARQ-ACK) codebook design for multiple PDSCH scheduling according to an embodiment of the present disclosure. In some examples, a UE is configured with more than one serving cell. In this case, the UE will repeat the determination for each serving cell as shown in FIG. 10. The UE repeats the determination procedure for each serving cell, and the final determined DL slots are the union among all the serving cell. In FIG. 10, we assume two serving cells are configured, and the determined DL slots are slot n-7, n-6, n-5, n-4, n-3, n-2, n-1 for both serving cell 1 and serving cell 2. In some examples, the type 1 codebook size for each serving cell is equal to the determined number of slots. In example as illustrated in FIG. 10, for configuration of two serving cells, the codebook size is 14 bits.

Figure 11:
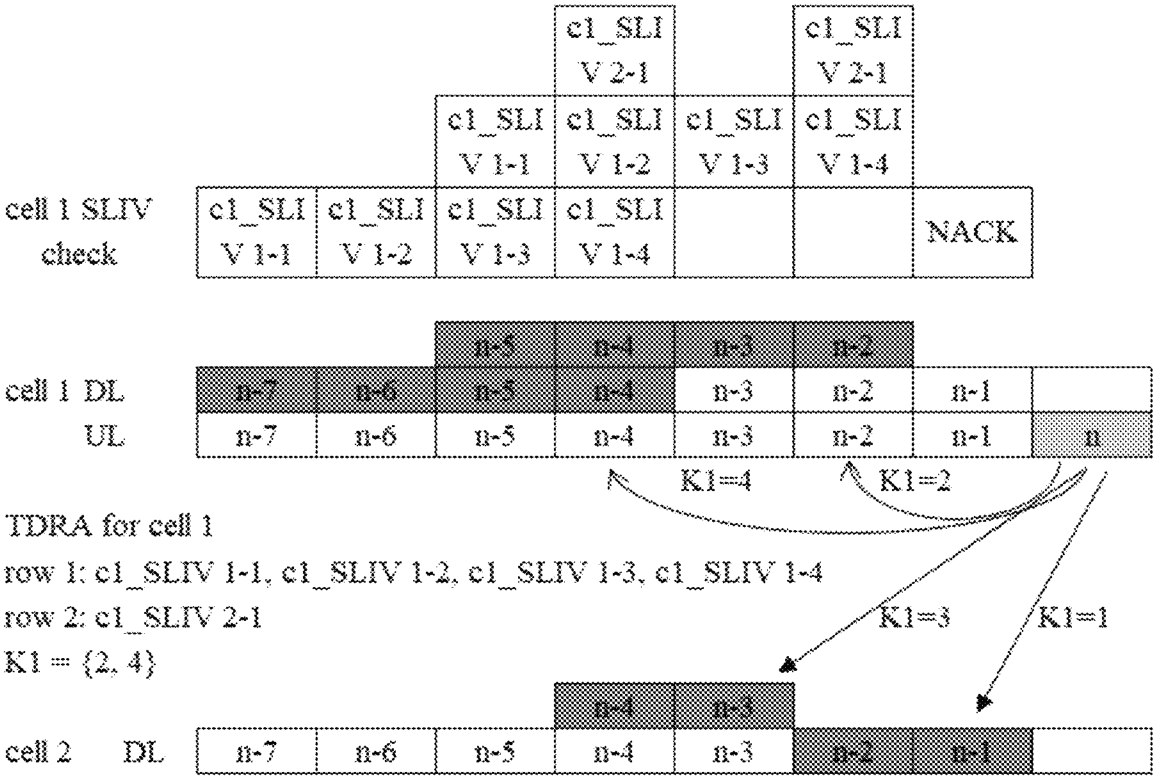
FIG. 11 is a schematic diagram illustrating an example of a method for hybrid automatic repeat request acknowledgement (HARQ-ACK) codebook design for multiple PDSCH scheduling according to an embodiment of the present disclosure.

FIG. 11 illustrates an example of a method for hybrid automatic repeat request acknowledgement (HARQ-ACK) codebook design for multiple PDSCH scheduling according to an embodiment of the present disclosure. In some examples, to determine the bit size for type 1 codebook, a UE needs to further check the SLIV in each of the determined DL slot. The SLIV value determines the starting symbol of a PDSCH and the length of the PDSCH that may be scheduled within the determined DL slot. If after checking the SLIVs, all the possible PDSCHs to be scheduled in the determined DL slot are overlapped, there is only 1 bit reserved in the type 1 codebook for that DL slot. Reusing the example of FIG. 11, for serving cell 1, the UE will check the SLIV for each of the determined DL slots. For a given DL slot, the UE needs to check all the SLIV values that might be used for scheduling a PDSCH in this slot. If there is only one SLIV value can be used to schedule a PDSCH in this slot, the UE does not need to check the SLIV and will simply reserve 1 bit in the type 1 codebook for this slot. In FIG. 11, we have illustrate all the possible SLIV values corresponding to the determined DL slots. We see that for slot n-7, n-6, n-3, as there is only one possible SLIV value, the UE does not need to check the SLIV. While for slot n-5, n-4, n-2, the UE needs to check the SLIV values. Each SLIV value corresponds to a potential PDSCH transmission location in the slot. If the multiple potential PDSCH transmission derived from multiple SLIV values are overlapped in a slot, only 1 bit is reserved in the type 1 codebook for this slot for this serving cell. For DL slot n-1, as the PDSCH is not possible to be scheduled in this slot, a NACK bit is used to reserve a bit position in the type 1 codebook for serving cell 1.

FIG. 12 illustrates an example of a method for hybrid automatic repeat request acknowledgement (HARQ-ACK) codebook design for multiple PDSCH scheduling according to an embodiment of the present disclosure. Similarly, for serving cell 2, the SLIV check step is depicted in FIG. 12. For SLIV check, only slot n-3 and slot n-1 will need to check the SLIV. For slot n-3, the c2_SLIV 1-2 and c2_SLIV 2-1 are checked. And for slot n-1, c2_SLIV 1-2 and c2_SLIV 2-1 are checked. For slot n-4 and slot n-2, 1 bit is reserved for each slot. For slot n-7, n-6, n-5, NACK bit is used to reserve the bit position in the type 1 codebook.

FIG. 13 illustrates an example of a method for hybrid automatic repeat request acknowledgement (HARQ-ACK) codebook design for multiple PDSCH scheduling according to an embodiment of the present disclosure. In some examples, the type 1 codebook size determination depends on a number of K1 values and/or a maximum of number of PDSCH to be scheduled by a DCI and/or a maximum number of CBG for a transport block. For example, the type 1 codebook size determination is conducted in the following: For a serving cell c, the UE first determines N DL slots, where N is the number of configured K1 values. Reusing a same configuration example, where a UE is configured with 2 serving cells. For cell 1, the K1 values are configured to be {2, 4}, and the corresponding DL slots are slot n-4 and slot n-2. For cell 2, the K1 values are configured to be {1, 3}, and the corresponding DL slots are slot n-1 and n-3. Then, the union of the DL slots are slot n-4, n-3, n-2, n-1. To determine the codebook size, it is equal to the number of DL slots times the maximum number of PDSCHs scheduled by a DCI. In our example, the first row of the TDRA table of the cell 1 can schedule four PDSCH, which is the maximum PDSCHs value among all configured serving cells. Thus, the codebook size is 4*4=16 bits for each serving cell, i.e., in total of 32 bits for two configured serving cells as shown in FIG. 13. For cell 1, the first 4 bits are reserved for the HARQ-ACK information corresponding to the PDSCH reception scheduled in slot n-4. More specifically, a DCI can either schedule 4 PDSCHs or 1 PDSCH according to the configured TDRA for cell 1, when a DCI schedules 4 PDSCHs, the last PDSCH is received in slot n-4, then the UE reports the HARQ-ACK information corresponding to these 4 PDSCHs in the first 4 reserved bits. The ordering can be pre-defined, e.g., the first bit corresponds to the HARQ-ACK information of the first scheduled PDSCH, the second bit corresponds to the HARQ-ACK information of the second scheduled PDSCH and so on. When only 1 PDSCH is scheduled by a DCI and the PDSCH is received in slot n-4, the 4th bit is used for the HARQ-ACK information corresponding to the PDSCH reception, while the 1st to the 3rd bit are set to NACK. Similar procedure is applied for the 4 bits for slot n-2. For slot n-3 and slot n-1, since no PDSCH can be scheduled in these slots for serving cell 1, only NACK bits are reserved.

FIG. 14 illustrates an example of a method for hybrid automatic repeat request acknowledgement (HARQ-ACK) codebook design for multiple PDSCH scheduling according to an embodiment of the present disclosure. In some examples, for a given serving cell and for each determined DL slot, the reserved number of bits is equal to the maximum between the max number of PDSCH scheduled by a DCI and the configured max number CBG. For instance, when serving cell 1 in FIG. 14 is configured with CBG transmission and the max CBG is 8, then for each determined DL slot as presented in the previous examples, the UE reserves max (max CBG, max PDSCH)=max(8, 4)=8 bits. In some examples, for cell 1, when the network uses a DCI to schedule multiple PDSCHs in which the last scheduled PDSCH falls in the determined DL slot, the UE reports the HARQ-ACK information corresponding to the scheduled PDSCHs from the last bit backwards among the 8 bits. Assuming a DCI schedules 4 PDSCHs (e.g., row 1 of TDRA table of cell 1), the UE reports the NACK-ACK information of the fourth PDSCH reception in the last bit of the 8 bits, and the UE reports the NACK-ACK information of the 3rd PDSCH reception in the 7th bit of the 8 bits, and reports the NACK-ACK information of the 2nd PDSCH reception in the 6th bit of the 8 bits, and reports the NACK-ACK information of the 1st PDSCH reception in the 5th bit of the 8 bits. In some examples, for cell 1, when the network uses a DCI to schedule one PDSCH that falls in the determined DL slot, the UE reports the same HARQ-ACK information of the PDSCH reception repeatedly in the 8 bits of the determined DL slot.

Commercial interests for some embodiments are as follows. 1. Solving issues in the prior art. 2. Providing a method for hybrid automatic repeat request acknowledgement (HARQ-ACK) codebook design for multiple PDSCH scheduling. 3. Reducing a signaling overhead. 4. Providing a good communication performance. 5. Providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR licensed and non-licensed or shared spectrum communications. Some embodiments of the present disclosure propose technical mechanisms.

Figure 15:
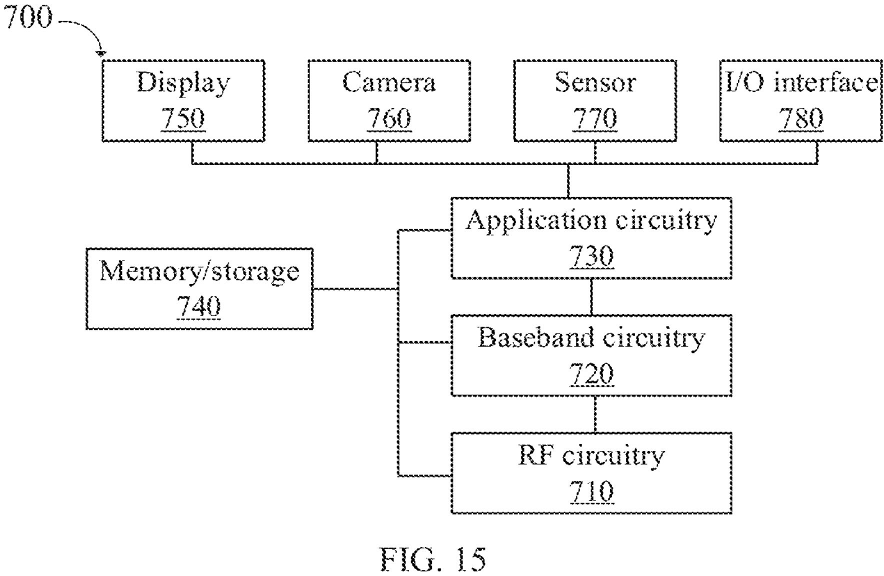
FIG. 15 is a block diagram of a system for wireless communication according to an embodiment of the present disclosure.

FIG. 15 is a block diagram of an example system 700 for wireless communication according to an embodiment of the present disclosure. Embodiments described herein may be implemented into the system using any suitably configured hardware and/or software. FIG. 15 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:
- being configured, by a base station, with a first information for a serving cell; and
- determining one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers;
- wherein the UE determines a type 1 codebook size depends on a number of K1 values, a maximum of number of PDSCHs to be scheduled by a DCI, and/or a maximum number of coding block groups (CBG) for a transport block;
- wherein for a given serving cell and for each determined DL slot, a reserved number of bits is equal to a maximum between a maximum number of PDSCHs scheduled by the DCI and a configured maximum number of CBGs, wherein when one PDSCH scheduled by the DCI falls in the determined DL slot, the UE reports a same HARQ-ACK information of a PDSCH reception repeatedly in the reserved number of bits of the determined DL slot.

2. The method of claim 1, wherein the UE determines the type 1 codebook size by determining the one or more slots associated with the PDSCH based on the first information.

3. The method of claim 1, wherein the one or more slots are used for a candidate PDSCH reception, a semi-persistent scheduling (SPS) PDSCH release, or an SPS PDSCH reception.

4. The method of claim 3, wherein a value of K1 is used to determine a last slot for the candidate PDSCH reception, the SPS PDSCH release, or the SPS PDSCH reception.

5. The method of claim 4, wherein the last slot for the candidate PDSCH reception, the SPS PDSCH release, or the SPS PDSCH reception is determined by a downlink (DL) slot of a DL bandwidth part (BWP) that is an uplink (UL)

slot n-K1 of an UL BWP, and the UL slot n is an initial UL slot, wherein the DL BWP and the UL BWP have a same subcarrier spacing (SCS).

6. The method of claim 4, wherein the last slot for the candidate PDSCH reception, the SPS PDSCH release, or the SPS PDSCH reception is determined by a downlink (DL) slot of a DL bandwidth part (BWP) that is overlapped with an uplink (UL) slot n-K1 of an UL BWP, and the UL slot n is an initial UL slot, wherein the DL BWP and the UL BWP have a different subcarrier spacing (SCS).

7. The method of claim 1, wherein the UE uses the TDRA table to expand DL slots for the candidate PDSCH reception, the SPS PDSCH release, or the SPS PDSCH reception according to the PUCCH slot.

8. The method of claim 1, wherein the UE determines one or more initial DL slots from the PUCCH slot and one or more K1 values.

9. The method of claim 1, wherein the UE expands a DL slot by a maximum number (L) of a PDSCH scheduled by a downlink control information (DCI).

10. The method of claim 1, wherein a value of L can be derived from the TDRA table, the TDRA table contains N rows, and each row contains one or more start and length indicator value (SLIV) values, where N in an integer.

11. The method of claim 10, wherein a greatest number of SLIV values among N rows is a value of L, determined DL slots for the candidate PDSCH reception, the SPS PDSCH release, or the SPS PDSCH reception according to the PUCCH slot are a union of expanded DL slots, and the method further comprises determining whether the expanded DL slots are valid.

12. The method of claim 10, wherein the UE checks the one or more SLIV values in the determined DL slot to determine the type 1 codebook size, and the one or more SLIV values determine a starting symbol of the PDSCH and a length of the PDSCH that can be scheduled within the determined DL slot.

13. The method of claim 10, wherein:

if there is only one SLIV value used to schedule the PDSCH in a DL slot, the UE does not need to check the SLIV value and reserves 1 bit in a type 1 codebook for the DL slot;

if PDSCH transmissions derived from SLIV values are overlapped in one slot, the UE reserves 1 bit in the type 1 codebook for the DL slot; or if the PDSCH is not to be scheduled in the DL slot, the UE uses a negative acknowledgment (NACK) bit to reserve a bit position in the type 1 codebook.

14. The method of claim 1, wherein the UE is configured with serving cells, the UE determines DL slots for each serving cell, and determined DL slots are a union between the serving cells, the type 1 codebook size for each serving cell is equal to a determined number of DL slots, and the determined DL slots are consecutive non-uplink slots.

15. The method of claim 1, wherein the type 1 codebook size is equal to a number of DL slots times the maximum number of PDSCHs scheduled by the DCI.

16. A wireless communication method by a base station, comprising:

configuring, to a user equipment (UE), a first information for a serving cell; and controlling the UE to determine one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers;

wherein the UE determines a type 1 codebook size depends on a number of K1 values, a maximum of number of PDSCHs to be scheduled by a DCI, and/or a maximum number of coding block groups (CBG) for a transport block;

wherein for a given serving cell and for each determined DL slot, a reserved number of bits is equal to a maximum between a maximum number of PDSCHs scheduled by the DCI and a configured maximum number of CBGs, wherein when one PDSCH scheduled by the DCI falls in the determined DL slot, the UE reports a same HARQ-ACK information of a PDSCH reception repeatedly in the reserved number of bits of the determined DL slot.

17. A base station, comprising:

a memory;

a transceiver; and a processor coupled to the memory and the transceiver;

wherein the processor is configured to perform the method of claim 16.

18. A user equipment (UE), comprising:

a memory;

a transceiver; and a processor coupled to the memory and the transceiver;

wherein the processor is configured to:

be configured, by a base station, with a first information for a serving cell; and determine one or more slots associated with a physical downlink shared channel (PDSCH) based on the first information, wherein the first information comprises at least one of a physical uplink control channel (PUCCH) slot, M K1 candidate values, or a time-domain resource assignment (TDRA) table, where M and K1 are integers;

wherein the UE determines a type 1 codebook size depends on a number of K1 values, a maximum of number of PDSCHs to be scheduled by a DCI, and/or a maximum number of coding block groups (CBG) for a transport block;

wherein for a given serving cell and for each determined DL slot, a reserved number of bits is equal to a maximum between a maximum number of PDSCHs scheduled by the DCI and a configured maximum number of CBGs, wherein when one PDSCH scheduled by the DCI falls in the determined DL slot, the UE reports a same HARQ-ACK information of a PDSCH reception repeatedly in the reserved number of bits of the determined DL slot.

* * * * *